United States Patent
Landau

(10) Patent No.: US 9,071,467 B2
(45) Date of Patent: Jun. 30, 2015

(54) MULTIPLE CARRIER GATEWAY SYSTEM, METHOD AND APPARATUS

(75) Inventor: John Landau, Mountain Lakes, NJ (US)

(73) Assignee: ITXC IP Holding S.a.r.l., Luxembourg (LU)

( * ) Notice: Subject to any disclaimer, the term of this patent is extended or adjusted under 35 U.S.C. 154(b) by 0 days.

(21) Appl. No.: 13/363,824

(22) Filed: Feb. 1, 2012

(65) Prior Publication Data

US 2012/0127990 A1    May 24, 2012

Related U.S. Application Data

(62) Division of application No. 10/727,255, filed on Dec. 3, 2003, now abandoned.

(60) Provisional application No. 60/434,288, filed on Dec. 18, 2002.

(51) Int. Cl.
*H04M 7/00* (2006.01)
*H04L 12/66* (2006.01)
*H04M 7/12* (2006.01)

(52) U.S. Cl.
CPC ............. *H04L 12/66* (2013.01); *H04M 7/1205* (2013.01); *H04M 7/125* (2013.01)

(58) Field of Classification Search
USPC ............................... 370/352; 379/219, 220.01
See application file for complete search history.

(56) References Cited

U.S. PATENT DOCUMENTS

| | | | | |
|---|---|---|---|---|
| 5,406,620 A | * | 4/1995 | Pei | 379/221.02 |
| 2006/0253896 A1 | * | 11/2006 | Sitaraman et al. | 726/2 |

* cited by examiner

*Primary Examiner* — Rasha Al Aubaidi
(74) *Attorney, Agent, or Firm* — Kaplan Breyer Schwarz & Ottesen, LLP

(57) ABSTRACT

A system, method and apparatus adapted to provide multiple voice communication carriers access to a data network via a single gateway.

17 Claims, 4 Drawing Sheets

| PORT | P1 | P2 | P3 | P4 | P5 | P6 | P7 |
|---|---|---|---|---|---|---|---|
| CARRIER | C1 | C2 | C3 | C4 | C5 | C6 | C7 |

MULTIPLE CARRIER GATEWAY SYSTEM, METHOD AND APPARATUS

This application is a Divisional Application of U.S. patent application Ser. No. 10/727,255, filed Dec. 3, 2003, entitled "Multiple Carrier Gateway System, Method and Apparatus", which claims the benefit of U.S. Provisional Patent Application Ser. No. 60/434,288, filed Dec. 18, 2002, all of which applications are hereby incorporated by reference herein.

FIELD OF THE INVENTION

The present invention relates to telephony over packet switched data networks. More particularly, the present invention relates to a system, method and apparatus adapted to provide multiple voice communication carriers access to a data network via a single gateway. In other embodiments, the invention may be expanded to include interfacing between plural networks of any type., such as Voice of the Internet (Voip) to Voip, Voip to PSTN, PSTN to PSTN, etc.

BACKGROUND OF THE INVENTION

Data Network Telephony

Data networks such as the Internet are now being used to transmit voice. Such data-network-based telephony networks provide an alternative to public-switched telephone networks ("PSTNs") for placing telephone calls. U.S. Pat. No. 6,404,864 describes data-network-based telephone networks in detail and is incorporated herein in its entirety by reference.

FIG. 1 depicts a schematic diagram of a system 100 for conventional voice communications over a data network. The system includes data network 102 and public-switched telephone networks ("PSTN") 120 and 122. The specifics of the architectures and communications protocols of such systems are not described herein except to note that they are quite different from one another such that direct communication there between is not possible without converting formats, protocols, etc. It will be appreciated that while two PSTNs (i.e., PSTN 120 and 122) are depicted, there is, at least functionally, only one worldwide PSTN.

System 100 therefore also includes gateway 110 that acts as a conduit between PSTN 120 and data network 102, and gateway 112 serving as a conduit between data network 102 and PSTN 122. In general a gateway is an entrance to and an exit from a communications network. A gateway is typically an electronic repeater device that intercepts and translates signals from one network to another. A gateway often includes a signal conditioner that filters out unwanted noise and controls characters. In data networks, gateways are typically a "node" on both networks that connects two otherwise incompatible networks. Thus, gateways often perform code and protocol conversions. Such an operation would be required for communication between a PSTN and a data network. Assuming an analog voice signal is delivered from the PSTN, the gateway digitizes that signal from the PSTN and encodes it and transmits it as "packets" (hereinafter "digitized voice signal") over the data network according to data network protocols. In other embodiments, the signal from the PSTN is a digital signal, such that analog-to-digital conversion is not required. Protocol conversion is still required.

An element associated with a gateway is a "gatekeeper." A gatekeeper is responsible for gateway registration, address resolution and the like. A gatekeeper may be viewed as the route identifier that directs a digitized voice signal to a "terminating" gateway (i.e., a gateway that provides protocol conversion for transmission over a PSTN, for example, to a telephone). A gatekeeper is charged with determining the best routing for connecting a particular call from a caller device to a callee device. A gatekeeper is an example of an intelligent node that determines routing information. For purposes of explanation herein, we use a gatekeeper system, although it is understood that the gatekeeper is not the only manner of implementing the intelligent node, and that any type of computer may serve the same function. Moreover, it is also possible that in some circumstances the intelligent node and the gateway may be built on the same hardware platform.

The system further includes telephone 130 that is connected, via link L1, to PSTN 120 and telephone 136 that is connected, via link L8, to PSTN 122. The links that are depicted in FIG. 1 are, as is well known, trunk lines, trunk groups, etc., as appropriate.

In operation, voice message 140 from telephone 130 is transmitted over link L1 to PSTN 120. Within PSTN 120, voice message 140 is routed to switch S2 over link L2. Switch S2, the operation of which is well known in the art, will typically route voice message 140 to another switch (not shown) over a trunk group (not shown). In such a manner, voice message 140 moves through PSTN 120 being routed from switch to switch until it is carried over a final link L3 out of PSTN 120. Voice message 140 is then carried, over link L4, to gateway 110.

"Originating" gateway 110 performs protocol conversion and digitizes, as required, voice signal 140. Voice message 140 is then routed (the gatekeeper's function) into data network 102. For clarity of presentation, the voice message will be assigned the same reference numeral (e.g., 140), notwithstanding the fact that the signal carrying the message is physically changed during transmission through the system.

Message 140 is transmitted over call path DNCP to "terminating" gateway 112 wherein the signal leaves data network 102. Note that the designation "originating" or "terminating" applies on a call-by-call basis. In other words, for a first call, a particular gateway can be an originating gateway, while for a second call, that same gateway can be a terminating gateway. Moreover, packets typically flow in both directions since both parties typically talk.

A call path through a data network, such as call path DNCP through data network 102, is not fixed according to a defined hierarchy as in a PSTN. Rather, an originating gateway "selects" a terminating gateway and the voice signal is routed by successive network elements (e.g., routers, bridges, etc.) through the data network to the terminating gateway. Typically, there is a set of rules that is executed in the system in order to ascertain the appropriate terminating gateway or other routing to use. These rules are executed for each call, and are often executed at an intelligent server that is remote from both the originating gateway and the terminating gateway. Often, the communication involves sending one or more parameters of the call (e.g. the called number) from the gateway to the intelligent node, executing some routing rules at the intelligent node, and returning a response that specifies one or more terminating gateways that can be used to complete the call. Since routing decisions are made by each network element, call path DNCP is not a priori known or set.

Gateway 112 receives voice message 140 and converts it to a form suitable for transmission through PSTN 122. Voice message 140 is delivered over link L5 to PSTN 122. Within PSTN 122, voice message 140 is routed via over links, such as link L6, to switches, such as switch S4. Voice message 140 is carried over link L7 out of PSTN 122 to link L8 to telephone 136 to complete the call.

Currently, in order for a VoIP termination network provider to maximize service offerings such as but not limited to prepaid calling card services, the only options are to add originating gateways or add local PSTN dial-in access to originating gateways. It would be advantageous and cost effective to add local PSTN access rather than add more gateways. However, a significant drawback to the prior art is that each gateway is limited in that only one carrier can be associated with a given gateway. All of the functions associated with authorization, accounting, and authentication are implemented for the carrier either at the gateway or at a remote server connected to the gateway.

Due to the above present day architecture, it is difficult to distribute the initial and maintenance costs of gateways among plural carriers. As such, a need exists for a data-network-based telephony system that provides a gateway that can accommodate more than one carrier.

SUMMARY OF THE INVENTION

The present invention provides a system, method and apparatus for providing a gateway to which more than one carrier may be assigned.

To implement such an approach, calls to originating gateways must be identified such that they are associated with a given carrier. In the embodiments described herein such identification is achieved by (1) assigning to each carrier identifying indicia that can be associated with a call; (2) storing such information in memory associated with said gateway; (3) reading data associated with an incoming call; (4) comparing said data of an incoming call to stored carrier-identifying data; (5) if said data corresponds to a given carrier, granting access to said call through said originating gateway to a carrier-operated server; (6) if said data does not correspond to any carrier associated with said gateway, terminating the call. In a preferred embodiment once the call is authenticated an IVR script from another server or node associated with a particular carrier may "answer" the call.

Calls to a gateway are identified by a property or properties that enable a gateway to identify a call as being associated with a particular carrier. Such properties may include information such as a prefix or suffix appearing in the sequence of dialed digits, which may include digits associated with a calling card, electronic token, a PIN, a URL, a bit embedded in the data, or the like. Alternatively in a preferred embodiment a gateway is provided having more than one port wherein each port is associated with a particular carrier. The identifying properties may also be out of band, such as information contained in SS7 signaling or the like. Calls routed through particular ports are authenticated and routed to a server, node, etc. owned or maintained by the corresponding carrier.

Alternatively, the functionality of the plural servers may be implemented in plural software modules in the gateway or a separate device, with the appropriate software module being executed at the gateway or separate device The server associated with the particular carrier may then authenticate the call, perform an IVR script, execute any required billing and accounting software, or perform any other call related functions deemed necessary by the operator and/or owner of said servern and carrier.

A call identification scheme according to the present invention may use any of the foregoing properties mentioned hereinabove or any other identification means that would be well known to one skilled in the art.

DETAILED DESCRIPTION OF THE PREFERRED EMBODIMENTS

Figure 1:
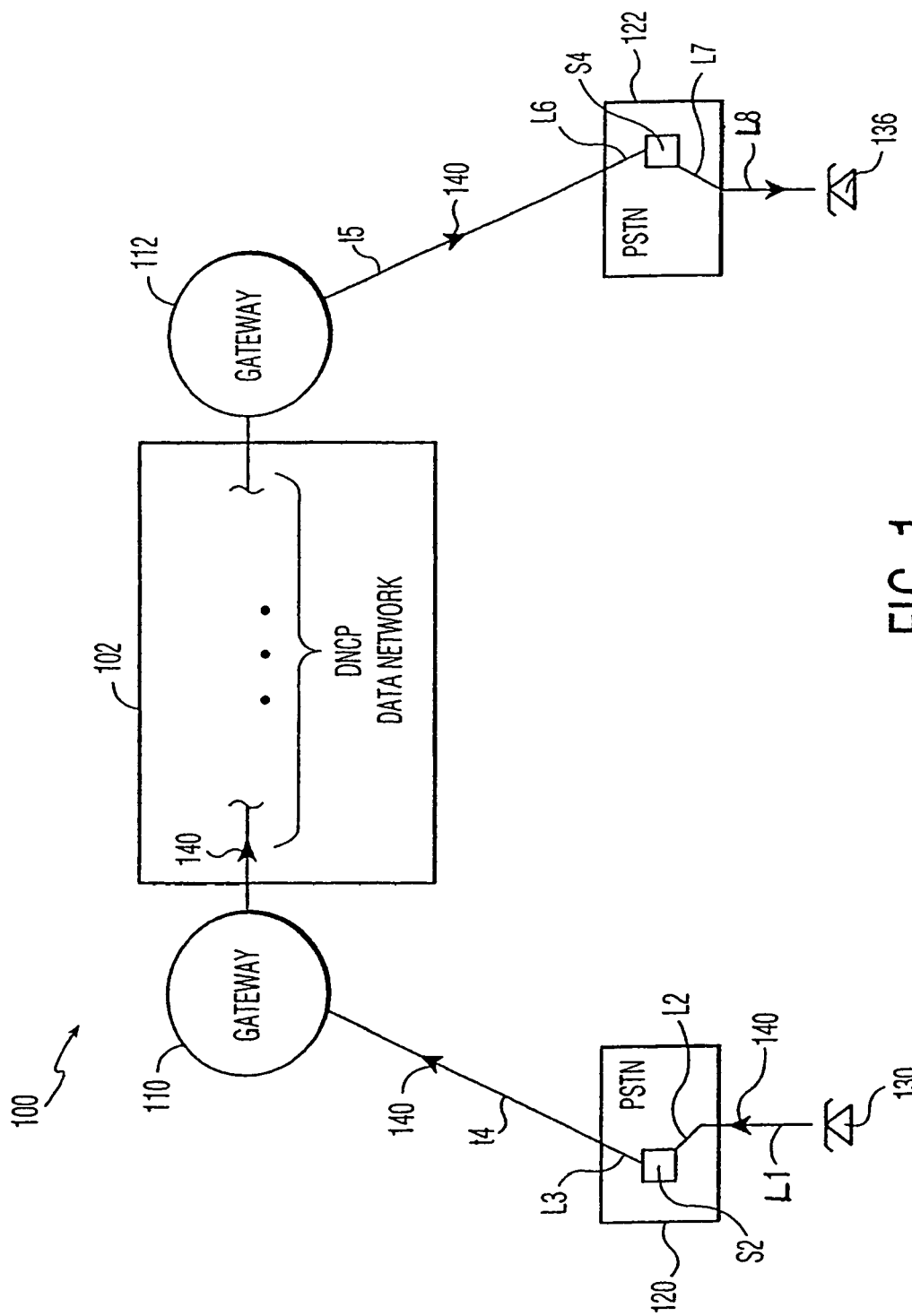
FIG. 1 depicts voice communications over a data network in the prior art.

The present invention solves the above and other problems of the prior art by permitting a single gateway to be associated with more than one carrier.

Before one or more embodiments of the invention are explained in detail, it is to be understood that the invention is not limited in its application to the details of construction or the arrangements of components set forth in the following description or illustrated in the drawings (the terms "construction" and "components" being understood in the most general sense and thus referring to and including, in appropriate contexts, methods, algorithms, processes and subprocesses). The invention is capable of other embodiments and of being practiced or being carried out in various ways. Also, it is to be understood that the phraseology and terminology used herein is for the purpose of description and should not be regarded as in any way limiting.

For purposes of illustration, the invention will be described within the context of the following exemplary scenario: a telephony over data-network system, utilizing the Internet as the data network, and effectuating telephone calls between various destinations around the world. A destination can be a city, a part of a city, or, as is convenient in most telephony applications, a set of telephone customers served by a certain common set of digits in a telephone number, such as an area code (e.g., 212), or an area code plus an exchange (e.g., "212-455") or any other defined sequence of numbers within a telephone number (e.g., "212-455-9XXX").

For clarity of explanation, the illustrative embodiments of the present invention are presented as a collection of individual functional blocks. The functions that such blocks represent can be provided using either shared or dedicated hardware, including, without limitation, hardware which can execute software. Illustrative embodiments may comprise general processor and/or DSP hardware, read-only memory (ROM) for storing software performing the operations described below, memory (RAM) for storing computational results and for storing call data, as well as memory for storing pre-established rules and identification data.

Figure 2:
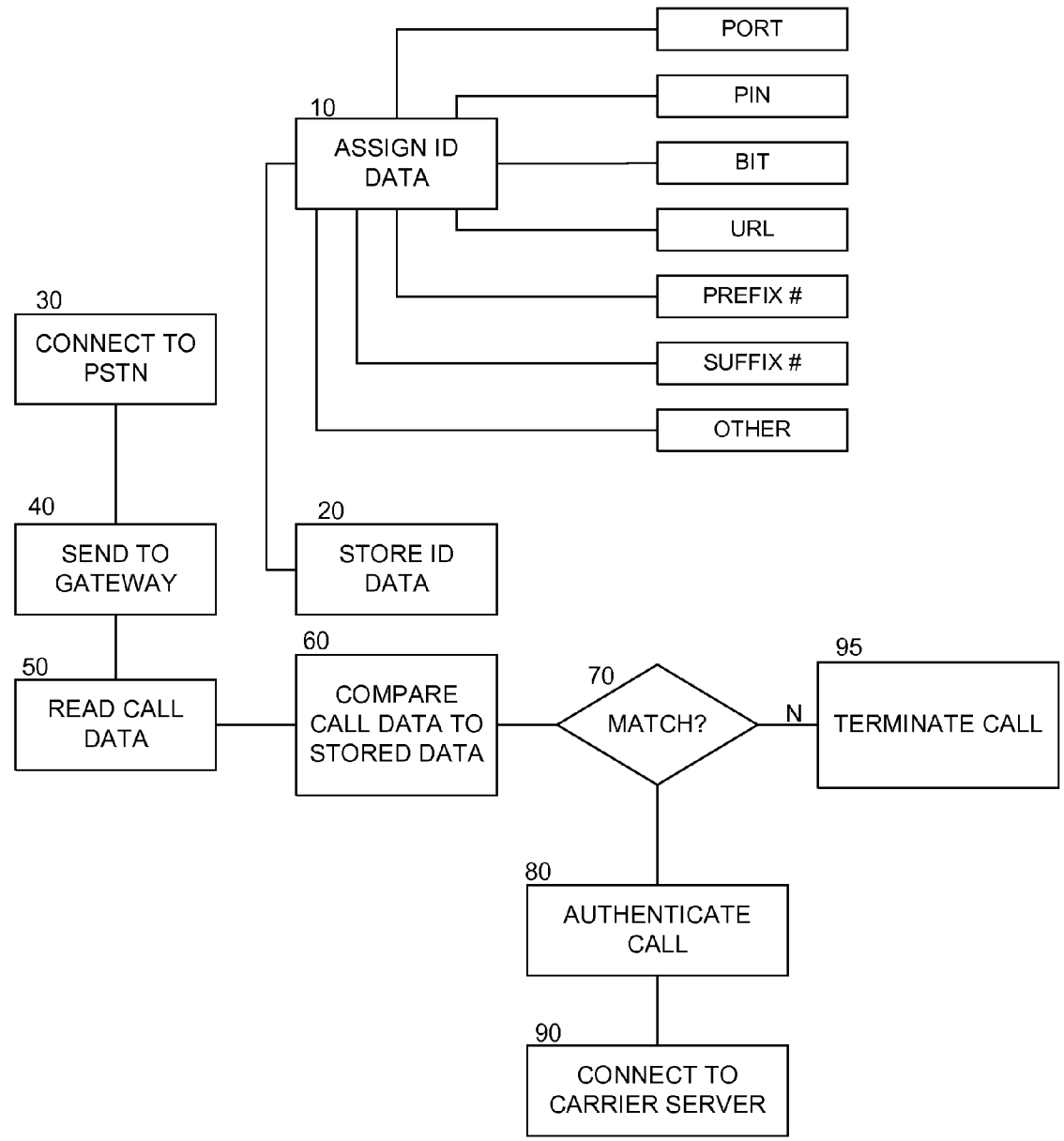
FIG. 2 is a flow diagram of a preferred embodiment according to the present invention.

Now referring to FIG. 2, the general process that comprises the system and method of the present invention is depicted. In block 10 it is determined what data will be used as indicia for identifying the carrier with which a particular call is associated. A system gateway administrator may perform this determination.

In block 20 the selected identifying data are stored in a database accessible by a gatekeeper at an originating gateway.

Calls are connected to the PSTN in block 30 and are received in an originating gateway in block 40. Data associated with an incoming call is read in block 50 by the gatekeeper and the read data is compared to stored data in block 60. If the incoming call contains carrier-identifying data corresponding to the assigned data as depicted in block 70 the call is authenticated as being associated with a particular carrier according to block 80. The call is then connected to the appropriate carrier server according to block 90.

If said data does not correspond to any carrier associated with said gateway the call is terminated in block 95 or otherwise rejected. For example the gatekeeper may be adapted to recycle the call to block 50 a given number of times to reattempt authorization.

Figure 3:
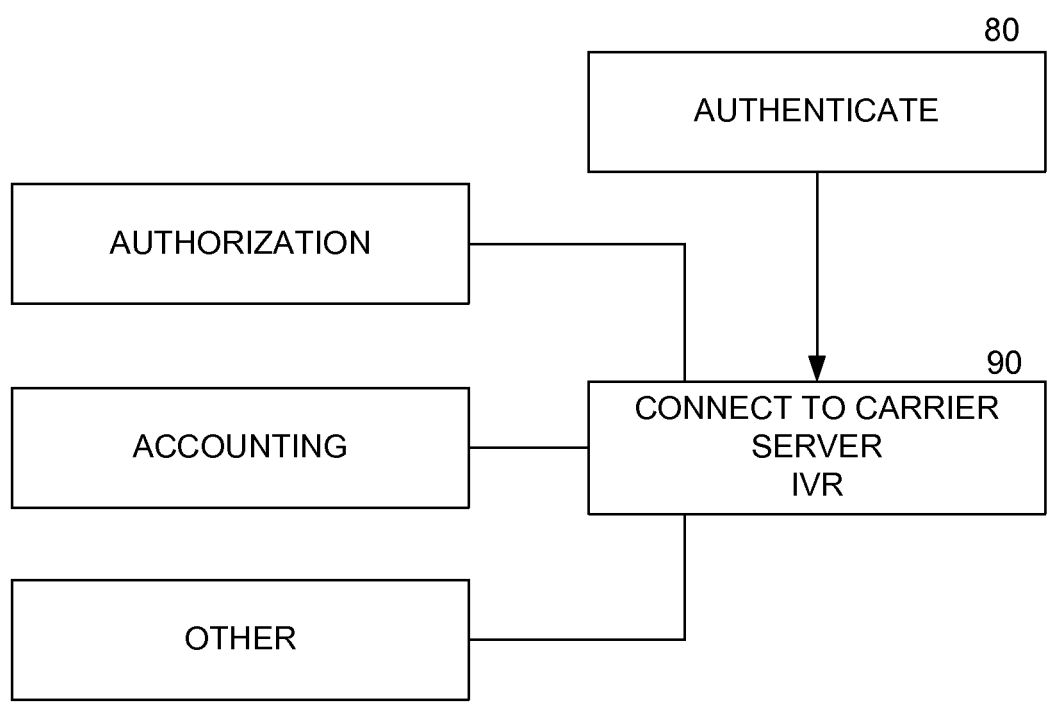
FIG. 3 is a flow diagram of a preferred embodiment of the present invention.

Now referring to FIG. 3 in a preferred embodiment once the call is authenticated an Interactive Voice Response (IVR) script from another server or node associated with a particular carrier may "answer" the call. In general IVR is a software application that accepts a combination of voice telephone input and touch-tone keypad selection and provides appropriate responses in the form of voice, fax, callback, e-mail and other media. Known IVR applications include bank and stock account balances and transfers, call center forwarding, order entry transactions, surveys, selective information lookup and the like. Typical IVR applications provide pre-recorded voice responses for appropriate situations, keypad signal logic, access to relevant data and the like. As applied to computer telephony integration, IVR applications can hand off a call to a human being who can view data related to the caller at a display. In terms of the present application, IVR can be applied to authorization and accounting functions such as may be required in communications employing a prepaid calling card, electronic token or the like.

Various properties of a call may be employed to identify to a gateway a particular carrier associated with the call. For example, as seen in FIG. 2 in block 10 such properties may include information such as a prefix or suffix appearing in the sequence of dialed digits such as but not limited to a PIN such as might be associated with a calling card, prepaid calling card, an electronic token, a URL or the like, a bit embedded in the call, or other properties.

Figures 4, 5:
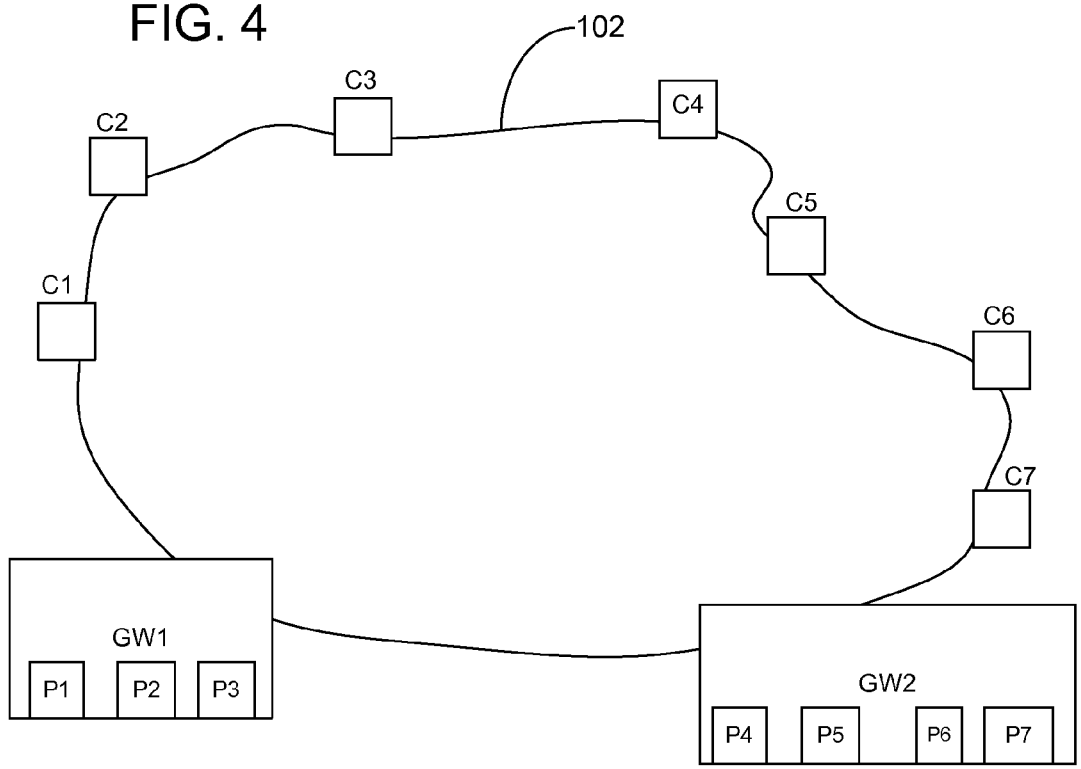
FIG. 4 depicts a preferred embodiment according to the present invention.
FIG. 5 is a tabular representation of a preferred embodiment according to the present invention.

Alternatively, in one most preferred embodiment each carrier is assigned a particular port in a gateway. In this way multiple carriers can be assigned to a single gateway. Now referring to FIG. 4, for example, gateway GW1 comprises ports P1, P2 and P3 and gateway GW2 comprises ports P4-P7. Carrier servers C1-C7 are network servers maintained by different carriers. Now referring to FIG. 5, each of carrier servers C1-C7 are assigned a particular port within a particular gateway. Now referring to FIG. 2, block 10, the indicia for identifying the carrier with which a particular call is associated is the port assigned to that carrier for that gateway. Calls sent to a particular gateway in block 40 contain an identifier corresponding to a particular port in that gateway. The call is then authenticated and connected to the appropriate carrier server as in block 90.

It is noted that the functions implemented by the IVR or other similar systems include authentication, accounting, and authorization (AAA). In the case of prepaid calling cards, the AAA functions may be performed by the third party, as explained above. However, it may also be the case that the port on which the call arrives represents a carrier or other entity that has been preauthorized. Thus, a gateway or system can be built such that calls arriving on ports 1 or 2 automatically are authorized, and calls arriving on ports 3-5 are sent to the appropriate third party for AAA or similar functions. Therefore, the present invention contemplates a gateway or system of gateways in which incoming calls may be routed to a third party for AAA functions, or where the AAA functions may be done locally at the gateway or assumed to have already been done, all depending upon the call characteristics such as arrival port. The gateway or system can thus determine how any particular call should be processed for AAA functionality.

It is also noted that the carriers need not be public carriers, but can be private enterprises or organizations. The term carrier is intended to cover such other entities as well.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method that enables an originating gateway to operate with more than one originating communications carrier, the method comprising:
  providing said one originating gateway, wherein the gateway comprises more than one arrival port;
  uniquely assigning, to each originating communications carrier, a respective arrival port;
  storing carrier-identifying indicia indicative of the more than one originating communications carrier in a storage medium accessible to the gateway;
  comparing the carrier-identifying indicia to data associated with an incoming call; and
  connecting the call if one of said carrier-identifying indicia matches the data associated with the call, utilizing a carrier server corresponding to said communications carrier associated with said carrier-identifying indicia, said carrier server having data associated with said call.

2. The method of claim 1 wherein connecting the call further comprises receiving an IVR script from the server associated with the carrier.

3. The method of claim 1 wherein the carrier-identifying indicia comprises at least one digit associated with said incoming call.

4. The method of claim 1 wherein the carrier-identifying indicia comprises a PIN.

5. The method of claim 1 wherein the number of arrival ports is equal to or greater than the number of communications carriers.

6. The method of claim 5 wherein the carrier-identifying indicia comprises an arrival port identifier.

7. The method of claim 1 further comprising assigning the carrier-identifying indicia, wherein the assigning is performed by a system gateway administrator.

8. The method of claim 1 wherein calls received at one of the assigned arrival ports do not require authentication.

9. The method of claim 1 wherein calls received at one of the assigned arrival ports are routed to a third party for authentication.

10. The method of claim 1 wherein calls received at one of the assigned arrival ports are authenticated at the gateway.

11. A system comprising:
  one originating gateway comprising a plurality of arrival ports and connected to a plurality of communications carriers, wherein each one of the communications carriers are assigned to a particular one of the arrival ports, each of the assigned arrival ports being different from each other;
  a plurality of communications carrier-identifying indicia stored in a storage medium accessible by the originating gateway;
  means for comparing the indicia to data associated with an incoming call; and
  means responsive to one of the indicia matching data contained in the call for connecting the call to a carrier server for authentication, the carrier server being associated with the one indicia.

12. The system of claim 11 further comprising a means for receiving an IVR script from the communications carrier associated with the incoming call.

13. The system of claim 11 wherein the indicia comprises at least one digit associated with the incoming call.

14. The system of claim 11 wherein the indicia comprises a PIN.

15. The system of claim 13 wherein the number of ports of the one originating gateway is at least as great as the number of communications carriers.

16. The system of claim 15 wherein the indicia comprises an arrival-port identifier.

17. The system of claim 11 further comprising a system gateway administrator and a means for assigning carrier-identifying indicia.

\* \* \* \* \*